United States Patent [19]

Slavin

[11] Patent Number: 5,362,238

[45] Date of Patent: Nov. 8, 1994

[54] METHOD FOR DRIVER EDUCATION THAT MIMICS INTOXICATION

[76] Inventor: Sidney H. Slavin, 9505 Carterwood Rd., Richmond, Va. 23229

[21] Appl. No.: 135,052

[22] Filed: Oct. 12, 1993

[51] Int. Cl.⁵ ............................................. G09B 19/16
[52] U.S. Cl. ...................................... 434/65; 434/62; 434/258; 351/47
[58] Field of Search ...................... 434/65, 62, 66, 258; 351/158, 47

[56] References Cited

U.S. PATENT DOCUMENTS

| 3,918,176 | 11/1975 | Abernethy, III et al. | |
|---|---|---|---|
| 4,058,911 | 11/1977 | Story | 434/258 |
| 4,522,474 | 6/1985 | Slavin | 351/203 |
| 4,698,564 | 10/1987 | Slavin | 351/158 |

FOREIGN PATENT DOCUMENTS

| 0299911 | 1/1989 | European Pat. Off. | 434/66 |
|---|---|---|---|
| 0050325 | 3/1940 | France | 351/47 |

*Primary Examiner*—Gene Mancene
*Assistant Examiner*—Jeffrey A. Smith

[57] ABSTRACT

A new realistic, inexpensive, adaptable, and portable driver education method that mimics the effects of intoxication in the participants through utilization of a simplified optics device in the form of specialized eyeglasses having binocular, manually-spinnable fresnel prism lenses is provided. The spinnable optics device simulates most of the toxic effects on the central nervous system which are induced by excess alcohol and/or drugs of abuse, resulting in distorted vision and spatial disorientation in the wearer. The driver education method involves the participants wearing the specialized eyeglasses while performing various ambulatory end non-ambulatory tasks.

20 Claims, 9 Drawing Sheets

METHOD FOR DRIVER EDUCATION THAT MIMICS INTOXICATION

BACKGROUND OF THE INVENTION

1. Technical Field of the Invention

The invention relates to the field of driver education and more particularly to a driver education method that harmlessly mimics the effects of intoxication in the participants.

2. Description of Prior Art

Driver education methods for teaching students about the effects of driving while intoxicated with alcohol and/or drugs of abuse typically involve classroom lectures, presentions of accident statistics, graphic crash scene films and guest speakers including wheelchair-bound quadriplegic former drunk drivers and victims of accidents caused by intoxicated drivers. These methods share one serious drawback: they are vicarious in nature, i.e., the student at best can experience the reality of driving while intoxicated only through the eyes of the lecturer, the film narrator, or the accident victim.

In order to provide students with a more realistic experience, driver education instructors may use special computerized simulators which incorporate films taken from a camera angle that approximates the view of an intoxicated driver. Some of these simulators are quite capable of accurately measuring and scoring foot pressure; braking distances; reaction times; perceptual judgments and hesitations; foot, hand, and eye coordination; variations in steering or turning angles, etc. for each student. The simulators can rapidly analyze and graphically present all of the above driving data. Unfortunately, most current high school simulator equipment is too unsophisticated to approach the excellent realism of most current military aviation and tank driving simulators with their 3-6 degrees of freedom of movement and control. In addition to lack of technological sophistication, high school simulator equipment is costly, immobile, and typically confined to indoor classroom use.

Some driving instructors question whether practice sessions in a computerized, film-based simulator can actually transfer to real world learning experience for driver education students. For example, simulator films emphasize central vision with an exaggerated, unrealistic diminution of all normal peripheral visual-sensory-motor stimuli and clues, and gravitational sensations. These diminished stimuli and sensations are more realistically experienced by actually moving in real space. The present invention allows the driver education students to move in real space without diminished peripheral stimuli and gravitational sensations.

The following U.S. Pat. Nos. are germane to the subject matter of the present invention:
- 4,522,474 Slavin
- 4,698,564 Slavin Both references teach the construction of a monocular and a binocular spinning optics device and use thereof in a visual training program. The device employs rotating lens(es) constructed of stick-on type lens material such as fresnel prisms, polarizing material, colored filters, cylinder prisms, reflective material, etc. affixed to plano-plastic disc(s). The present invention utilizes an optics device having binocular, manually-spinnable fresnel prism lenses of the type disclosed by the patents above, which are referred to herein and incorporated by reference.

SUMMARY OF THE INVENTION

Accordingly, it is an object of the present invention to provide a driver education method that harmlessly mimics the effects of intoxication in the participants through utilization of an optics device in the form of specialized eyeglasses having binocular, manually-spinnable fresnel prism lenses.

It is another object of the present invention to provide a driver education method that harmlessly mimics the effects of intoxication in the participants under conditions of total sobriety and cognitive awareness and without toxic alcohol- and/or drug-induced physiological effects upon the participants.

It is a further object of the present invention to provide a driver education method that harmlessly mimics the effects of intoxication in the participants which utilizes real time and space factors.

It is yet another object of the present invention to provide a driver education method that harmlessly mimics the effects of intoxication in the participants which is immediate in teaching impact.

It is yet a further object of the present invention to provide a driver education method that harmlessly mimics the effects of intoxication in the participants which is inexpensive.

A still further object of the present invention is to provide a driver education method that harmlessly mimics the effects of intoxication in the participants which is adaptable to indoor and outdoor use.

It is a final object of the present invention to provide a driver education method that harmlessly mimics the effects of intoxication in the participants which is portable.

The invention is a driver education method that harmlessly mimics the effects of intoxication in the participants by utilizing an optics device in the form of specialized eyeglasses having binocular, manually-spinnable fresnel prism lenses. The method involves the participant performing various ambulatory and non-ambulatory tasks, and then repeating the tasks wearing the optics device. The driver education instructor monitors and compares the participant's performances for each task.

Manual selection of the prism apex settings of the eyeglass lenses results in distorted vision and spatial disorientation in the wearer in a particular direction related to the setting, e.g., the prism apexes set in the "down" position create the sensation of stepping downhill in the wearer; the prism apexes set in the "right" position result in the wearer deviating to the right while performing an ambulatory task, etc. The glasses create visual and spatial perceptions in the wearer that mimic those resulting from intoxication with alcohol and/or drugs of abuse, without the toxic physiological effects of the latter.

DETAILED DESCRIPTION OF THE INVENTION

The first portion of the following description will focus on the structure of the optics device utilized in the method. The second portion of the description will focus on the driver education method.

Figure 1:
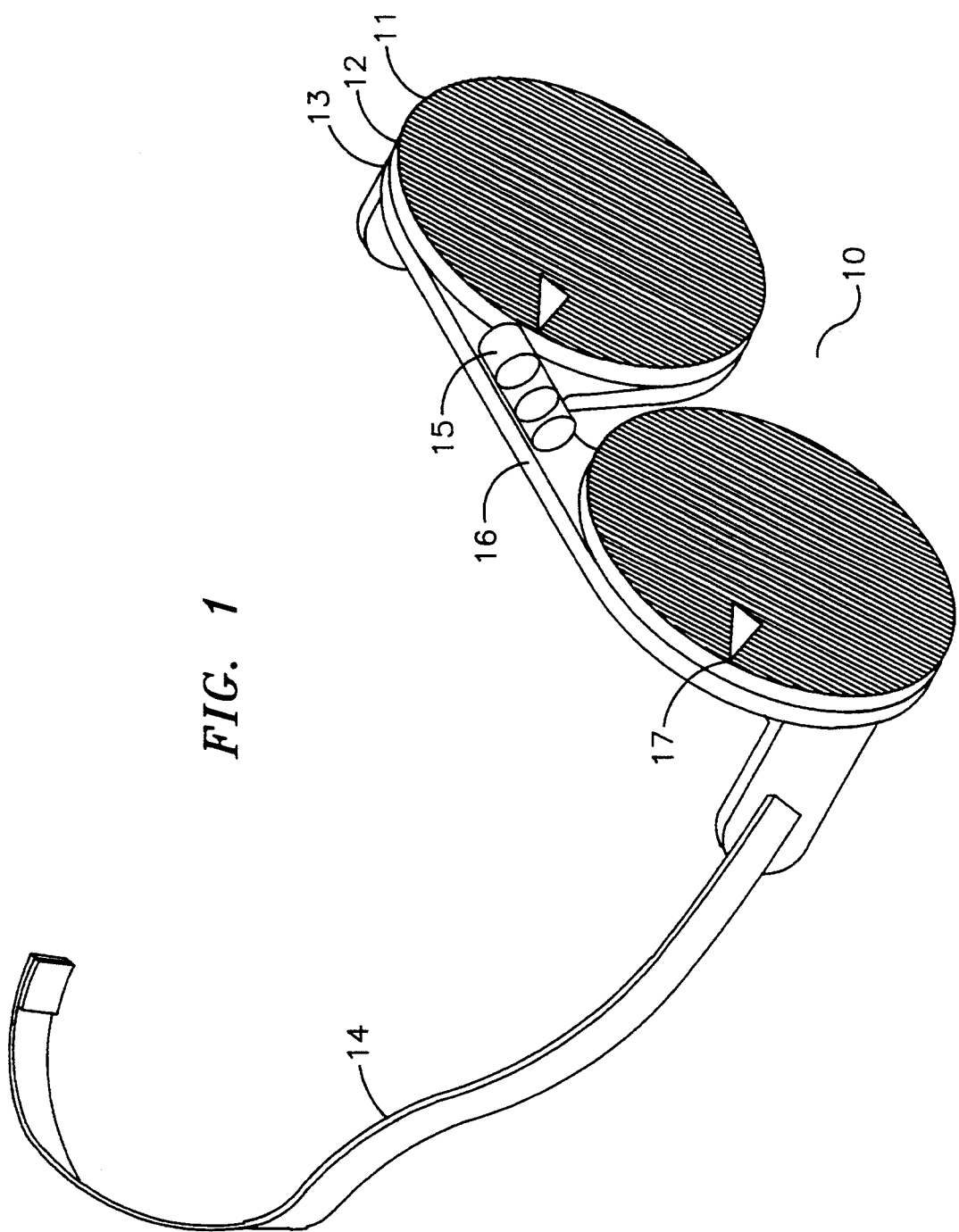
FIG. 1 is a perspective view of the optics device, in the form of specialized eyeglasses having binocular, manually-spinnable fresnel prism lenses, which is utilized in the driver education method.

Referring now to the drawings in detail, wherein like reference characters indicate like parts throughout the several figures, the reference numeral 10 in FIG. 1 refers generally to the binocular, manually-spinnable optics device utilized in the present invention. The optics device 10 is in the form of specialized eyeglasses having circular fresnel prism lenses 11 glued onto manually-spinnable plastic lens-holding rims 12 which are secured to ophthalmic frames 13 using three (3) protruding retainer pins (not shown), the ophthalmic frames 13 having an adjustable strap 14 such that the optics device 10 can be fitted to any individual's head. A level 15, mounted on the bridge 16 of the frames 13, assists with the fitting of the optics device 10 to the wearer's head. A triangle 17 on each fresnel lens 11 indicates the position of the prism apexes which corresponds to the direction of deviation of the wearer's vision. There are four basic manual settings for the binocular, manually-spinnable lenses 11. First, both lenses 11 can be set with the triangle 17 in the up direction. Second, both lenses 11 can be set with the triangle 17 in the down position. Third, both lenses 11 can be set with the triangle 17 in the left position. Finally, both lenses 11 can be set with the triangle 17 in the right position. In addition, the lenses 11 can be set in any intermediate position between the four basic positions. The optics device is of a size such that it may be worn over a participant's routine prescription eyeglasses.

Figure 2:
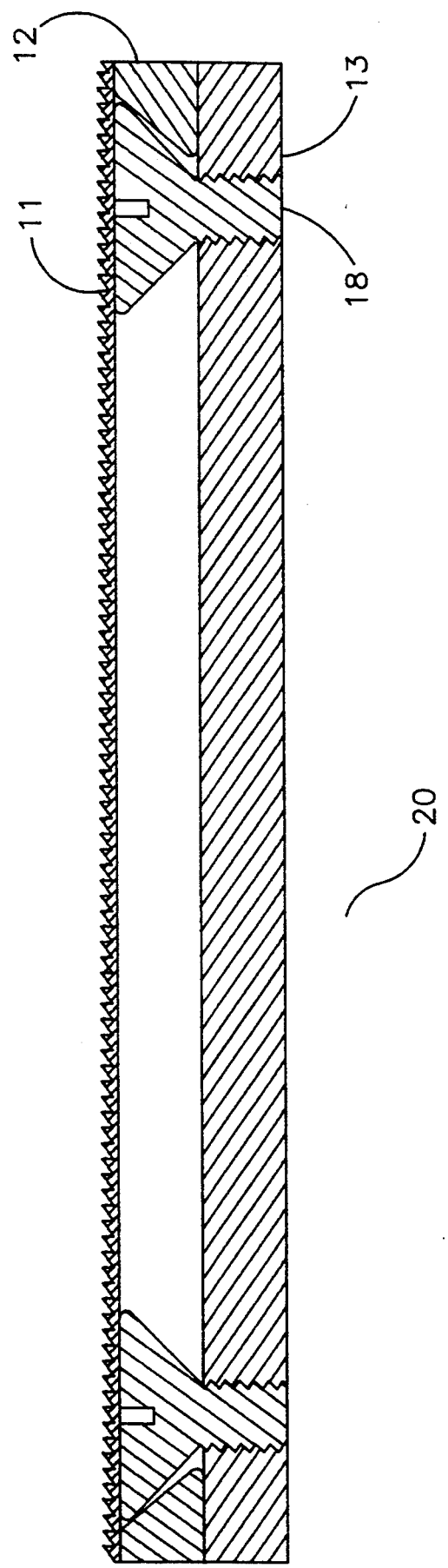
FIG. 2 is a cross-sectional view of one lens of the optics device, showing the parallel rows of prisms of the fresnel lens, the spinnable plastic lens-holding rim, and the protruding retainer pins which secure the spinnable lenses to the ophthalmic frames.

Referring now to FIG. 2, a cross-sectional view of one of the two (2) rotatable lenses of the optics device, the reference numeral 20 refers generally to the lens 11 mounted on the rim 12. A circular fresnel prism lens 11 is glued onto a rotatable plastic lens-holding rim 12. The rim 12 is secured to the ophthalmic frames 13 by means of three (3) protruding retainer pins 18.

Figure 3:
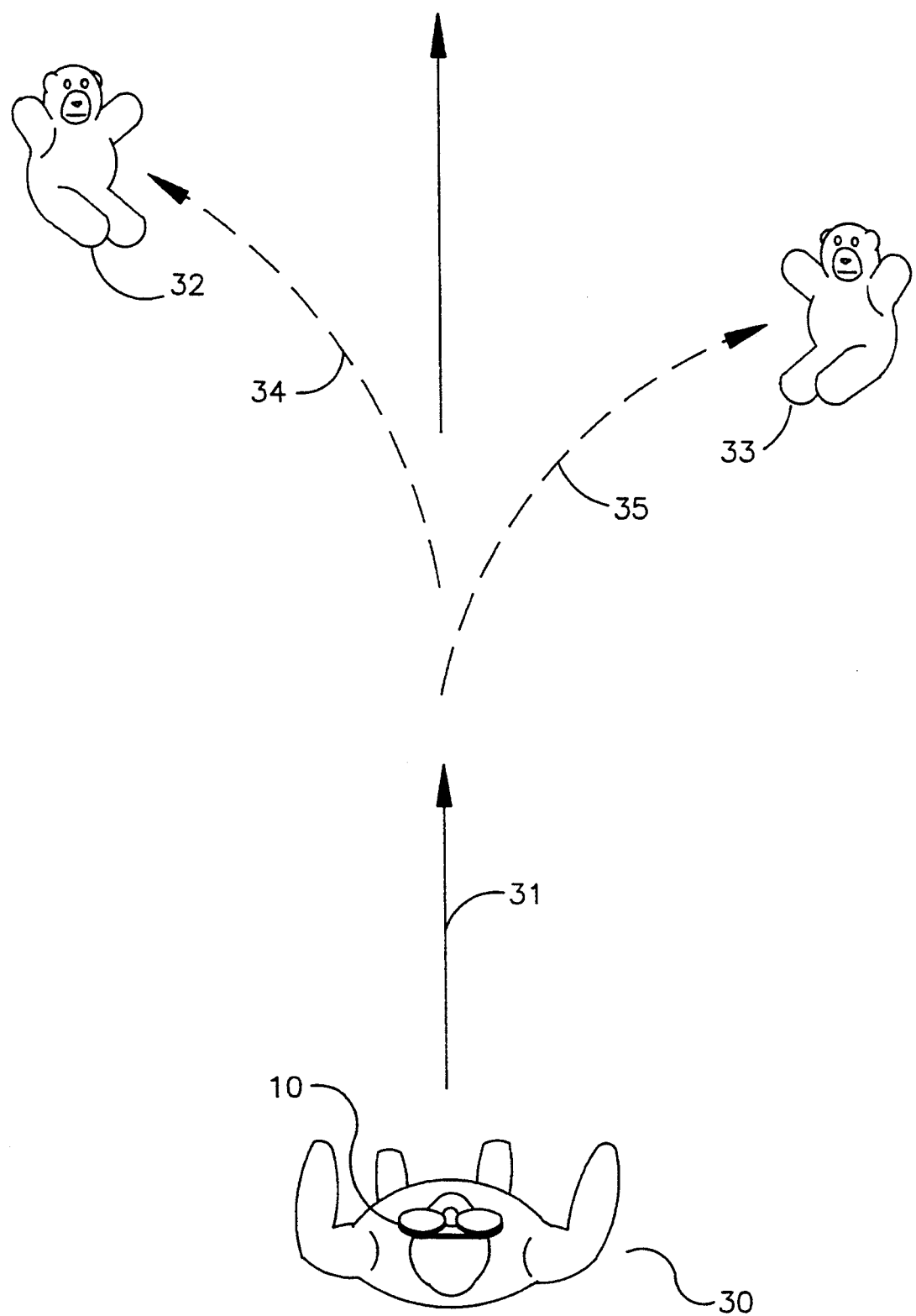
FIG. 3 is an illustration of the potential collision courses of a driver education participant wearing the optics device with the prism apexes of the manually-spinnable lenses set in the left or right position, respectively, with stuffed toys placed on either side of the participant's forward pathway.

Referring now to FIG. 3, an illustration of the potential collision courses of a participant wearing the optics device, the reference numeral 30 refers generally to a driver education participant wearing the optics device 10 during an ambulatory task which involves walking forward along a straight path 31 having stuffed toys 32, 33 placed on both sides of the path 31. Arrows 34 and 35 refer to possible deviations in the participant's path caused by the fresnel prism apexes set in the left and right positions, respectively, which result in the collisions of the participant 30 with the stuffed toys 32, 33.

Figure 4:
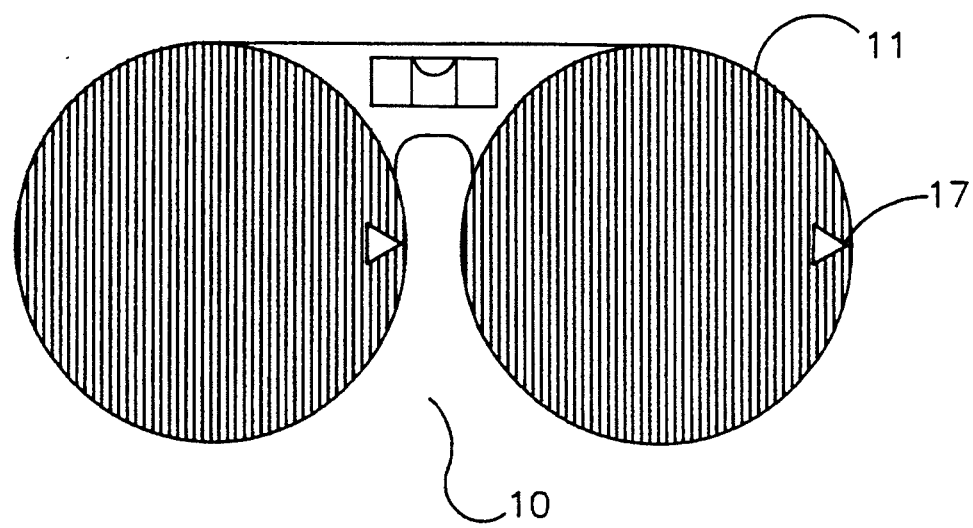
FIG. 4 is an illustration of the effect of the optics device on the wearer's vision, i.e. the prism apexes set in the left position cause leftward deviation of the vision.
Figure 4:
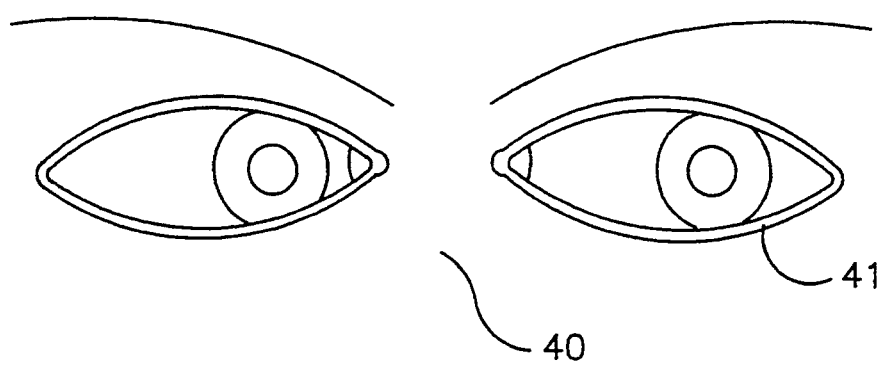
Figure 5:
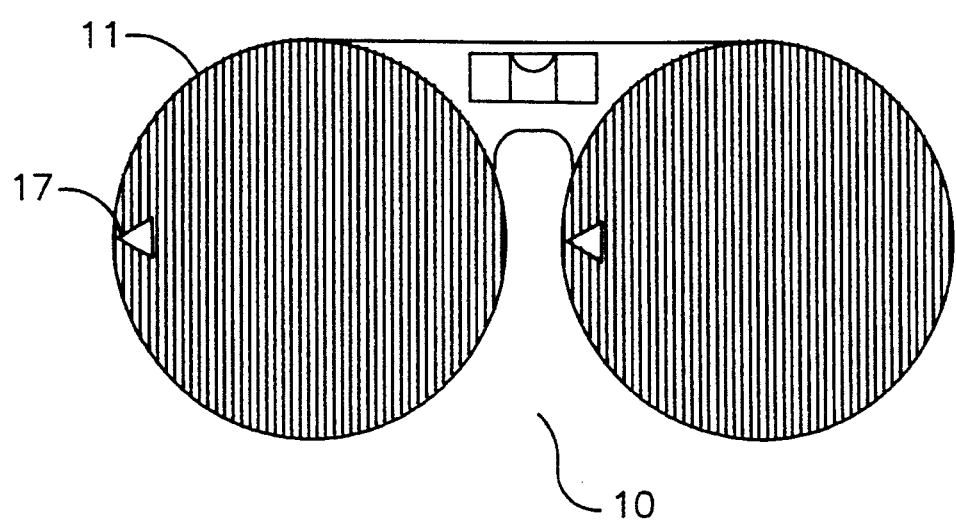
FIG. 5 is an illustration of the effect of the optics device on the wearer's vision, i.e. the prism apexes set in the right position cause rightward deviation of the vision.
Figure 5:
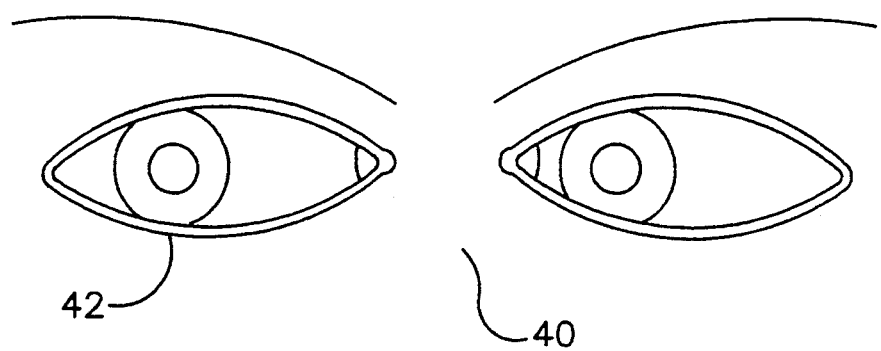

Referring now to FIGS. 4 and 5, illustrations of the effect of the optics device on the wearer's vision, the reference numeral 40 refers generally to the eyes of the wearer of the optics device 10. As seen in FIG. 4, the fresnel prism lenses 11, set with the triangles 17 (representing the prism apexes) in the left position, result in leftward deviation of the wearer's vision 41. As seen in FIG. 5, the fresnel prism lenses 11, set with the triangles 7 (representing the prism apexes) in the right position, result in rightward deviation of the wearer's vision 42.

Figure 6:
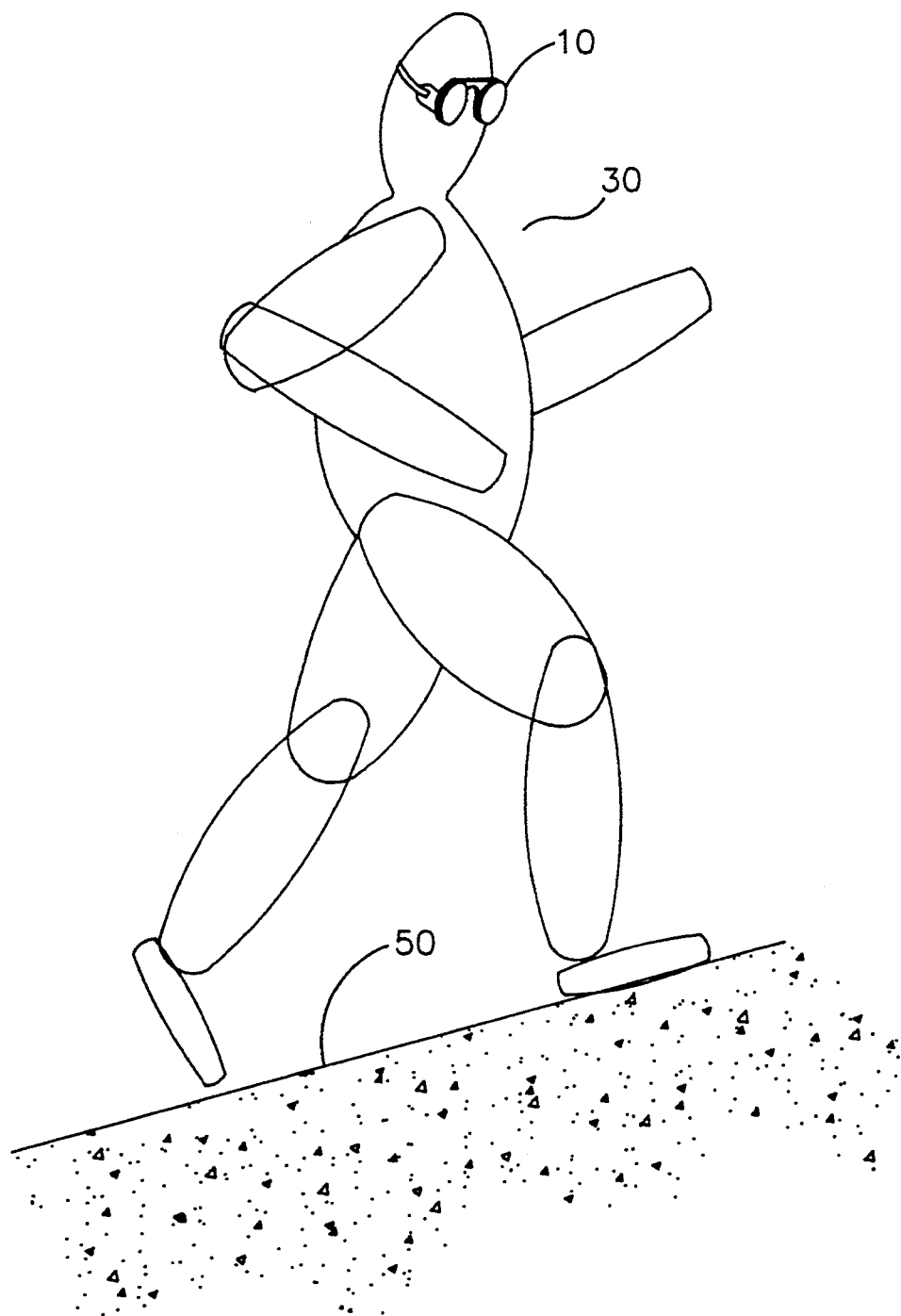
FIG. 6 is an illustration of a participant walking on a level, non-sloping surface while wearing the optics device with the prism apexes of the manually-spinnable lenses set in the up position, which deviate the vision upward and cause the sensation of walking uphill in the wearer.

Referring now to FIG. 6, an illustration of a participant walking on a level, non-sloping surface while wearing the optics device, the reference numeral 30 refers generally to a driver education participant and the reference numeral 50 refers generally to a level, non-sloping surface. The optics device 10, with the triangles (representing the prism apexes) of the manually-spinnable lenses set in the up position, deviates the vision upward and causes the sensation of walking uphill in the wearer.

Figure 7:
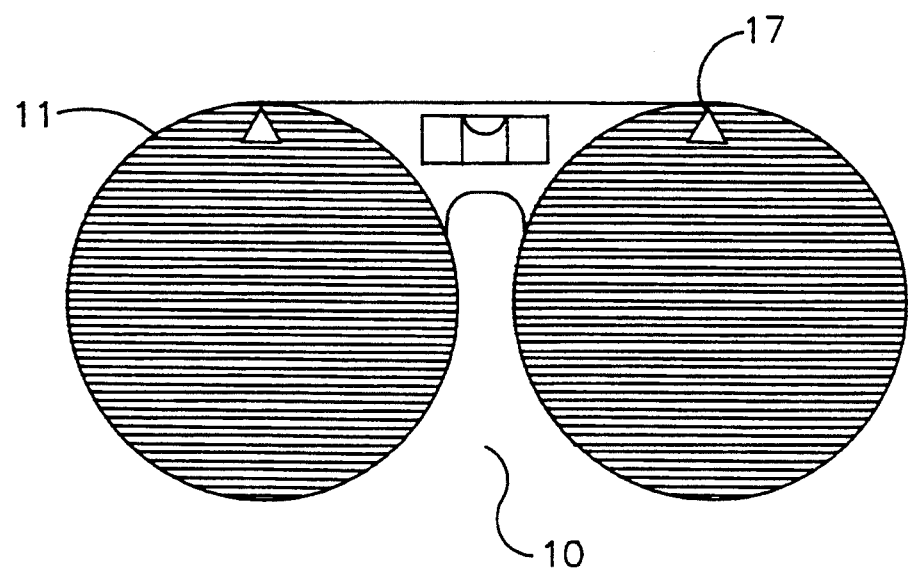
FIG. 7 is an illustration of the effect of the optics device on the wearer's vision, i.e. the prism apexes set in the up position cause upward deviation of the vision.
Figure 7:
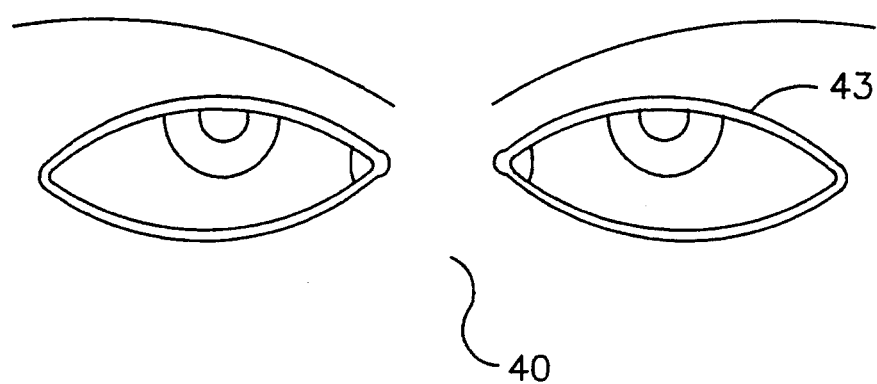

Referring now to FIG. 7, an illustration of the effect of the optics device on the wearer's vision, the reference numeral 40 refers generally to the eyes of the wearer. The fresnel prism lenses 11, set with the triangles 17 (representing the prism apexes) in the up position, result in upward deviation of the wearer's vision 43.

Figure 8:
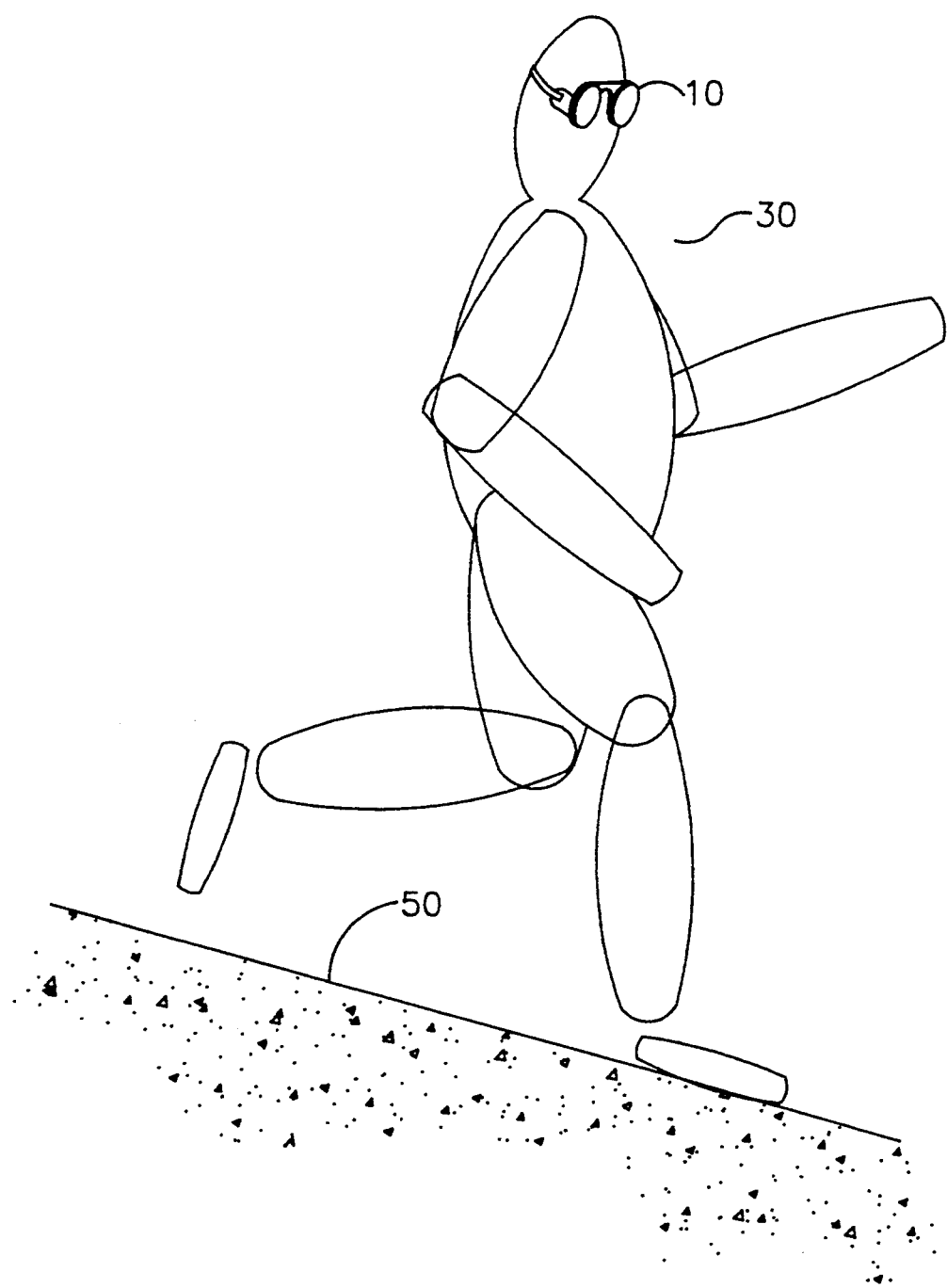
FIG. 8 is an illustration of a participant walking on a level, non-sloping surface while wearing the optics device with the prism apexes of the manually-spinnable lenses set in the up position, which deviate the vision upward and cause the sensation of walking uphill in the wearer.

Referring now to FIG. 8, an illustration of a participant walking on a level, non-sloping surface while wearing the optics device, the reference numeral 30 refers generally to a driver education participant and the reference numeral 50 refers generally to a level, non-sloping surface. The optics device 10, with the triangles (representing the prism apexes) of the manually-spinnable lenses set in the down position, deviates the vision downward and causes the sensation of walking downhill in the wearer.

Figure 9:
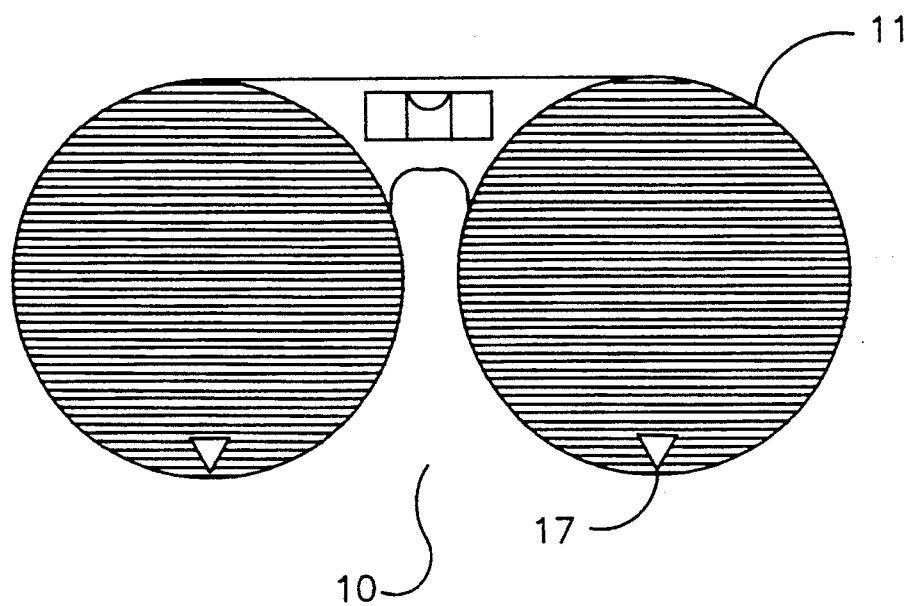
FIG. 9 is an illustration of the effect of the optics device on the wearer's vision, i.e. the prism apexes set in the down position cause downward deviation of the vision.
Figure 9:
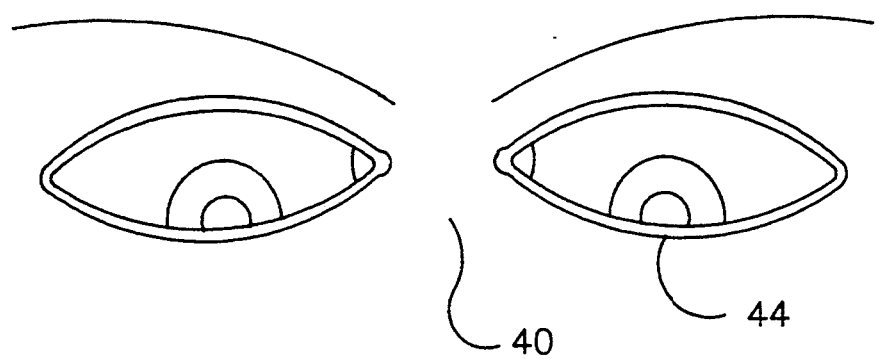

Referring now to FIG. 9, an illustration of the effect of the optics device on the wearer's vision, the reference numeral 40 refers generally to the eyes of the wearer. The fresnel prism lenses 11, set with the triangles 17 (representing the prism apexes) in the down position, result in downward deviation of the wearer's vision 44.

The following non-limiting examples serve to further illustrate the operation of the present invention:

EXAMPLE 1

A driver education participant walks along a straight path having stuffed toys placed on both sides of the path while an instructor monitors the participant's performance. The specialized eyeglasses, having binocular, manually-spinnable fresnel prism lenses, are positioned on the participant's head and the lenses, if not pre-adjusted, are adjusted to the left or right position. The participant walks along the path again, experiencing the visual and other perceptual impairments created by the eyeglasses, while being monitored by the instructor. Finally, the participant and instructor discuss and compare the performances, assessing the extent of visual-perceptual-motor impairment in the participant created by the eyeglasses.

EXAMPLE 2

A driver education participant walks along a path on a level, non-sloping surface while an instructor monitors the participant's performance. The specialized eyeglasses, having binocular, manually-spinnable fresnel prism lenses, are positioned on the participant's head and the lenses, if not pre-adjusted, are adjusted to the up or down position. The participant walks along the path again, experiencing the visual and other perceptual impairments created by the eyeglasses, while being monitored by the instructor. Finally, the participant and instructor discuss and compare the performances, assessing the extent of visual-perceptual-motor impairment of the participant created by the eyeglasses.

EXAMPLE 3

A driver education participant walks on a straight parking lot line while an instructor monitors the participant's performance. The specialized eyeglasses, having binocular, manually-spinnable fresnel prism lenses, are positioned on the participant's head and the lenses, if not preadjusted, are adjusted to the desired position. The participant walks on the line again, experiencing the visual and other perceptual impairments created by the eyeglasses, while being monitored by the instructor. Finally, the participant and instructor discuss and compare the performances, assessing the extent of visual-perceptual-motor impairment of the participant created by the eyeglasses.

EXAMPLE 4

Repeat Example 3, except that the participant walks a preset maze.

EXAMPLE 5

Repeat Example 3, except that the participant walks a traffic cone slalom course.

EXAMPLE 6

A driver education participant steers a dual brake control driver education vehicle while accompanied by an instructor. The participant steers the vehicle while the instructor controls the starting and stopping of the vehicle, which is operated at a maximum speed of five to 15 miles per hour. Another party stationed outside the vehicle monitors the participant's driving performance. The specialized eyeglasses, having binocular, manually-spinnable fresnel prism lenses, are positioned on the participant's head and the lenses, if not preadjusted, are adjusted to the desired position. The participant repeats the task while accompanied by the instructor and monitored by the other party. The participant is then able to experience the visual and other perceptual impairments created by the eyeglasses while steering the vehicle. Finally, the participant, instructor and monitor discuss and compare the performances, assessing the extent of visual-perceptual-motor impairment of the participant created by the eyeglasses.

EXAMPLE 7

Repeat Example 6 except that the participant steers a cart, unaccompanied by an instructor.

EXAMPLE 8

A driver education participant touches target objects, while an instructor monitors the participant's performance. The specialized eyeglasses, having binocular, manually-spinnable fresnel prism lenses, are positioned on the participant's head and the lenses, if not pre-adjusted, are adjusted to the desired position. The participant repeats the task, experiencing the visual and other perceptual impairments created by the eyeglasses, while being monitored by the instructor. Finally, the participant and instructor discuss and compare the performances, assessing the extent of visual-perceptual-motor impairment of the participant created by the eyeglasses.

EXAMPLE 9

A driver education participant throws and catches a ball with another party, While being monitored by an instructor. The specialized eyeglasses, having binocular, manually-spinnable fresnel prism lenses, are positioned on the participant's head and the lenses, if not pre-adjusted, are adjusted to the desired position. The participant repeats the task, experiencing the visual and other perceptual impairments created by the eyeglasses, while being monitored by the instructor. Finally, the participant and instructor discuss and compare the performances, assessing the extent of visual-perceptual-motor impairment of the participant created by the eyeglasses.

EXAMPLE 10

The driver education participant repeats Examples 1-9 except that the performances are filmed, and the film is discussed with the participant.

The advantages of the present invention are numerous. The driver education method provides participants with a non-vicarious training experience which utilizes real time and space factors, i.e., the participants can actually experience the visual and spatial perceptions created by the optics device that mimic those resulting from intoxication with alcohol and/or drugs of abuse, without the toxic physiological effects of the latter. In addition, the method is inexpensive. Finally, the method is portable, and therefore adaptable to indoor and outdoor use. Many variations will be apparent to those skilled in the art. It is therefore to be understood that, within the scope of the appended claims, the invention may be practiced other than as specifically described.

What is claimed as new and desired to be secured by Letters Patent of the United States is:

1. A method for driver education that harmlessly mimics intoxication in the participants, comprising the steps of:
    (a) having a driver education participant perform a task while visually monitoring said participant during performance of said task;
    (b) positioning on the head of said participant an optics device adjusted to distort vision to simulate intoxication;

(c) having said participant, wearing said optics device, repeat said task while visually monitoring said participant's repeat performance of said task; and (d) comparing said performances of said participant.

2. A method for driver education that harmlessly mimics the effects of intoxication in the participants as recited in claim 1, wherein said optics device comprises:

(a) ophthalmic frames having a bridge;

(b) binocular, fresnel prism lenses, said lenses glued onto manually-spinnable plastic rims, said rims secured with retainer pins to said ophthalmic frees;

(c) an adjustable strap, said strap attached to said ophthalmic frames; and (d) a level, said level glued onto the bridge of said ophthalmic frames.

3. A method for driver education that harmlessly mimics the effects of intoxication in the participants as recited in claim 2, wherein said monitoring further comprises the step of filming said participant.

4. A method for driver education that harmlessly mimics the effects of intoxication in the participants as recited in claim 2, wherein said task comprises the step of walking on a straight line having stuffed toys placed along either side of said line, wherein said positioning of said optics device comprises the step of fastening a strap of said optics device, and wherein said adjusting of said optics device comprises the step of rotating prism apexes of at least one fresnel lens of said optics device to the left or right position.

5. A method for driver education that harmlessly mimics the effects of intoxication in the participants as recited in claim 2, wherein said task comprises the step of walking along a path on a level, non-sloping surface, wherein said positioning of said optics device comprises the step of fastening a strap of said optics device, and wherein said adjusting of said optics device comprises the step of rotating prism apexes of at least one fresnel lens of said optics device to the up or down position.

6. A method for driver education that harmlessly mimics the effects of intoxication in the participants as recited in claim 2, wherein said task is ambulatory in nature, wherein said positioning of said optics device comprises the step of fastening a strap of said optics device, and wherein said adjusting of said optics device comprises the step of rotating prism apexes of at least one fresnel lens of said optics device to the desired position.

7. A method for driver education that harmlessly mimics the effects of intoxication in the participants as recited in claim 6, wherein said ambulatory task comprises the step of walking on a straight parking lot line.

8. A method for driver education that harmlessly mimics the effects of intoxication in the participants as recited in claim 6, wherein said ambulatory task comprises the step of walking a preset maze.

9. A method for driver education that harmlessly mimics the effects of intoxication in the participants as recited in claim 6, wherein said ambulatory task comprises the step of walking a traffic cone slalom course.

10. A method for driver education that harmlessly mimics the effects of intoxication in the participants as recited in claim 2, wherein said task is non-ambulatory in nature, wherein said positioning of said optics device comprises the step of fastening a strap of said optics device, and wherein said adjusting of said optics device comprises the step of rotating prism apexes of at least one fresnel lens of said optics device to the desired position.

11. A method for driver education that harmlessly mimics the effects of intoxication in the participants as recited in claim 10, wherein said non-ambulatory task comprises the step of steering a dual brake control driver education vehicle, said vehicle's starting and stopping being controlled by a driver education instructor not wearing said optics device, and said vehicle moving at a maximum speed of five to 15 miles per hour.

12. A method for driver education that harmlessly mimics the effects of intoxication in the participants as recited in claim 10, wherein said non-ambulatory task comprises the step of steering a cart.

13. A method for driver education that harmlessly mimics the effects of intoxication in the participants as recited in claim 10, wherein said non-ambulatory task comprises the step of throwing and catching a ball with another party.

14. A method for driver education that harmlessly mimics the effects of intoxication in the participants as recited in claim 10, wherein said non-ambulatory task comprises the step of touching target objects.

15. A method for driver education that harmlessly mimics intoxication in the participants, comprising the steps of:

(a) having a driver education participant perform a task while visually monitoring said participant during performance of said task;

(b) positioning on the head of a driver education participant an optics device, said optics device comprising specialized eyeglasses having binocular, manually-spinnable fresnel prism lenses, said positioning of said optics device comprising the step of fastening a strap of said optics device and adjusting said optics device, said adjusting comprising the step of rotating prism apexes of at least one fresnel lens of said optics device to the desired position;

(c) having said participant, wearing said optics device, repeat said task while visually monitoring said participant's repeat performance of said task; and (d) comparing said performances of said participant.

16. A method for driver education that harmlessly mimics the effects of intoxication in the participants as recited in claim 15, wherein said monitoring further comprises the step of filming said participant.

17. A method for driver education that harmlessly mimics the effects of intoxication in the participants as recited in claim 15, wherein said task further comprises an ambulatory task.

18. A method for driver education that harmlessly mimics the effects of intoxication in the participants as recited in claim 15, wherein said task further comprises a non-ambulatory task.

19. A method for driver education that harmlessly mimics intoxication in the participants, comprising the steps of:

(a) positioning on the head of a driver education participant an optics device, said optics device comprising specialized eyeglasses having binocular, manually-spinnable fresnel prism lenses, said positioning of said optics device comprising the step of fastening a strap of said optics device and adjusting said optics device, if not pre-adjusted, said adjusting comprising the step of rotating prism apexes of at least one fresnel lens of said optics device to the desired position;

(b) having said participant, wearing said optics device, perform a task while being visually monitored by a second party; and
(c) reviewing said participant's impressions received during performance of said task.

20. A method for driver education that harmlessly mimics the effects of intoxication in the participants as recited in claim 19, wherein said monitoring further comprises the step of filming said participant.

* * * * *